(12) United States Patent
Wormmeester et al.

(10) Patent No.: US 8,392,626 B2
(45) Date of Patent: Mar. 5, 2013

(54) PROGRAMMABLE CHANNEL CIRCUIT FOR COUPLING SIGNALS BETWEEN FIELD DEVICES AND CONTROL SYSTEMS

(75) Inventors: Erik J. Wormmeester, Best (NL); Adrianus C. M. Hamers, Berkel-Enschot (NL)

(73) Assignee: Honeywell International Inc., Morristown, NJ (US)

( * ) Notice: Subject to any disclaimer, the term of this patent is extended or adjusted under 35 U.S.C. 154(b) by 745 days.

(21) Appl. No.: 12/108,967

(22) Filed: Apr. 24, 2008

(65) Prior Publication Data

US 2009/0271558 A1 Oct. 29, 2009

(51) Int. Cl.
G06F 3/00 (2006.01)
G06F 13/12 (2006.01)
G06F 13/38 (2006.01)
G06F 13/00 (2006.01)
G01R 31/08 (2006.01)

(52) U.S. Cl. .................. 710/11; 710/8; 710/14; 710/15; 710/16; 710/62; 710/317; 370/252

(58) Field of Classification Search ........................ None
See application file for complete search history.

(56) References Cited

U.S. PATENT DOCUMENTS

| 4,852,080 | A | * | 7/1989 | Ohtake et al. ................. 370/295 |
| 5,179,353 | A | * | 1/1993 | Miyake ......................... 330/129 |
| 5,341,431 | A | * | 8/1994 | Griessman et al. ............. 381/15 |
| 6,567,653 | B1 | * | 5/2003 | Sanders ........................ 455/126 |
| 6,654,351 | B1 | * | 11/2003 | Casey ........................... 370/252 |
| 6,862,636 | B2 | * | 3/2005 | Young ............................ 710/69 |
| 6,981,090 | B1 | * | 12/2005 | Kutz et al. .................... 710/317 |
| 7,227,349 | B2 | * | 6/2007 | Kirkpatrick .............. 324/754.07 |
| 2001/0015924 | A1 | | 8/2001 | Arimoto et al. |
| 2003/0001618 | A1 | | 1/2003 | Haycock et al. |
| 2004/0199674 | A1 | * | 10/2004 | Brinkhus ........................ 710/1 |
| 2005/0058453 | A1 | | 3/2005 | Mostert et al. |
| 2005/0070177 | A1 | | 3/2005 | Stoll |
| 2006/0170403 | A1 | * | 8/2006 | Im ................................. 323/280 |
| 2007/0223382 | A1 | * | 9/2007 | Crabtree et al. ............. 370/236 |

OTHER PUBLICATIONS

Dual-Channel I/O Modules for Fieldpoint.
2. Netmaster.
Adam-4019 8 Channel Universal Analog Input Module.

* cited by examiner

*Primary Examiner* — Chu-Kuan Lee
*Assistant Examiner* — Henry Yu
(74) *Attorney, Agent, or Firm* — Jetter & Associates, P.A.

(57) ABSTRACT

A programmable channel circuit can include a control circuit having at least one bidirectional I/O terminal, at least one programming terminal, and one or more processing elements, and an interface circuit having first and second field terminals. The interface circuit is coupled to the control circuit via the processing elements. The control circuit can be operable to respond to a programming signal on the programming terminal for automatically selecting one of a plurality of communications modes. The selection couples the bidirectional I/O terminal to the first terminal via one of the processing elements associated with the selected communications mode.

20 Claims, 4 Drawing Sheets

US 8,392,626 B2

PROGRAMMABLE CHANNEL CIRCUIT FOR COUPLING SIGNALS BETWEEN FIELD DEVICES AND CONTROL SYSTEMS

FIELD OF THE INVENTION

The invention relates to circuits including interface circuits for field devices and more particularly, circuits including input/output (I/O) interfaces for connecting to field devices.

BACKGROUND OF THE INVENTION

In industrial settings, data, measurement values, control signals, and the like are generally transferred between control systems and one or more instruments or field devices (e.g., sensors or actuators), requiring a large number of interface circuits. The connection or input/output (I/O) pins for conventional interface circuits communicating with the industrial environment are typically designated in general, based on the function for the I/O pins. Generally, the function of an I/O pin is determined by the physical properties of the signal, upstream or downstream higher system functions, and the system configuration.

The physical properties are usually determined by the device characteristics and the computer system characteristics. For example, an analog input for a device is defined by its properties as an input for voltage or current. In general, additional properties may also be specified, such as input impedance, input range, transient response, over voltage resistance, etc. System functions are generally determined by analog/digital converters, if necessary, analog or digital filters, sequence controllers, processors, etc. Various forms of realization can be selected for these functions and their distribution among existing system components. The system configuration typically includes the configuration of the power supply, the connection of the I/O pins, the connection of the higher order systems, e.g., via a field bus, and the configuration of mechanical properties of the field devices.

In general, typical solutions use exchangeable components for realizing different types of I/O pins. The design and/or configuration of these components typically determine the physical properties of the I/O pins. In general, different components, which realize the required properties and especially the physical properties for each connection, have been produced for each specific type of I/O connection. Therefore, an array of different interface circuits must typically be produced, assembled, and kept in storage in case of failures or changes in I/O type. For example, typical interface circuits are formed as pluggable modules, which have identical arrangements of connection legs, so they can be readily replaced in case of failure or if a change in physical properties for an I/O signal is needed. However, even if interface circuits can be provided to support various types of signals, such components typically require rewiring to support the different I/O signal modes, increasing the likelihood of error in wiring and failure of the interface circuit and the associated monitoring system.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In a first embodiment of the present invention, a programmable channel circuit can include a control circuit having at least one bidirectional I/O terminal, at least one programming terminal, and one or more processing elements, and an interface circuit having first and second field terminals, the interface circuit coupled to the control circuit via the processing elements. The control circuit can be operable to respond to a programming signal on the programming terminal for automatically selecting one of a plurality of communications modes, when the selection couples the bidirectional I/O terminal to the first terminal via one of the processing elements associated with the selected one communications mode.

In a second embodiment of the present invention, a method for communicating with field devices can include coupling a field device to a control system via a channel circuit, where the channel circuit comprises a control circuit having at least one bidirectional I/O terminal coupled to the control system, at least one programming terminal, one or more processing elements, and an interface circuit having first and second field terminals coupled to the field device, where the interface circuit can be coupled to the control circuit via the processing elements. The method further includes providing a programming signal to the channel circuit via the programming port, where responsive to the programming signal, the control circuit is operable to automatically select one of a plurality of communications modes, and where the selection couples the bidirectional I/O terminal to the first terminal via one of the processing elements associated with the selected one communications mode.

DETAILED DESCRIPTION OF THE DRAWINGS

Figure 1:
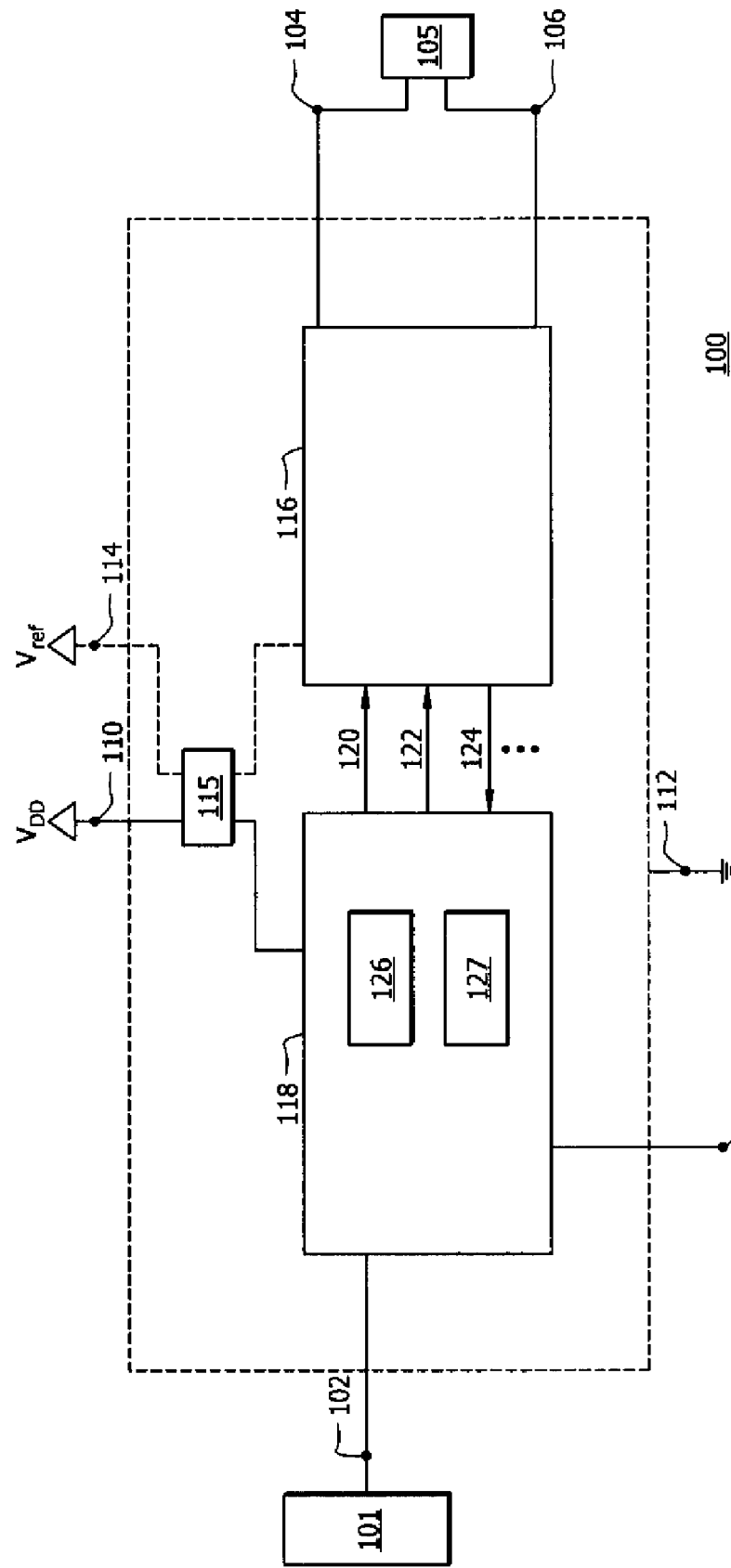
FIG. 1 is a block diagram of a channel circuit according to the various embodiments of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As previously described, conventional channel circuits which support various types of signals (analog I/O or digital I/O) typically require at least some minor amount of rewiring to provide the desired functionality. For example, a conventional module configured for I/O of a voltage or current typically requires at least three I/O pins. In such devices, each different combination of two of the three I/O pins supports I/O of a current or a voltage. Therefore, even if such channel circuits support all required types of signals, the end user is typically required to wire the components using a different set of pins for each signal type. Such rewiring increases the complexity of using such channel circuits and increases the possibility of user error. The inventors recognize that one of the major functional limitations resulting in such conventional channel circuit configurations has generally been the requirement that in order to reliably exchange signals between a computer or controller system and field devices, separated channel circuit paths are typically needed for each type of I/O.

The inventors have discovered that reliable exchange of information between field devices and a control system does not require providing a channel circuit having different and separated paths for managing different types of signals. Rather, the inventors have discovered that a channel circuit can be embodied using a single interface circuit. In particular, the inventors have designed programmable I/O channel circuit, so that regardless of the type of field device or the type of signal, only a single connection configuration is needed for coupling the field device to a control system via the channel circuit. Furthermore, a channel circuit according to the various embodiments of the present invention allows the physical properties of each I/O pin to be programmed. Accordingly, via user programming each pin is able to provide a wide range of functions, including digital or analog I/O.

FIG. 1 shows an exemplary arrangement of a channel circuit 100 according to the various embodiments of the present invention. In the various embodiments, the channel circuit 100 can have a series of ports or terminals, which are fixed for use with any application of the channel circuit 100. For example, as shown in FIG. 1, the channel circuit 100 can have a bidirectional I/O port 102, first and second field terminals 104, 106, and a programming port 108. Additionally, the channel circuit 100 can also include a power supply port 110 coupled to a power supply (VDD) and a grounding port 112. To use the channel circuit 100, the I/O port 102 can be coupled to a remote control system 101 and the field terminals 104, 106, can be coupled to a field device 105. Prior to use, the channel circuit 100 can be programmed for the specific I/O communications mode via the programming port 108. I/O communications modes can include, but are not limited to, digital input, digital output, analog input, and analog output. In some embodiments, other modes are possible, including digital I/O line monitoring or isolated analog I/O.

In some embodiments, one of more reference voltage ports 114 can also be provided for operating field connections 104, 106 at specific voltage levels. However, one of ordinary skill in the art will recognize that such reference voltages can be internally generated by the channel circuit 100 or the channel circuit 100 can be configured to require a supply voltage matching the reference voltage. For example, the supply voltage and the reference voltage can be provided using a voltage conversion circuit 115, such as a transformer, a rectifier, a filter, an amplifier, or any other circuit for generating a second voltage level from a first voltage level. However, the invention is not limited in this regard and the generation of all required power-supply voltages for the channel circuit 100, can be provided externally or internally.

The channel circuit 100 can be configured as an interface circuit 116 coupled to a control circuit 118 using any number of connections for exchanging signals. As shown in FIG. 1, there can be at least one digital output connection 120, at least one analog output connection 122, and one or more input connections 124. As used herein, "input" and "output" refer to the direction of transmission of signal through the interface circuit. Accordingly, a signal traveling to the field device 105 is referred to as an output signal, while a signal to the control system 101 is referred to as an input signal. Although dedicated analog and digital input connections between the interface circuit 116 and the control circuit 118 can be provided, one aspect of the present invention provides for reducing the amount of circuitry in the interface circuit 116 by using the same input connection, whether the input signal is analog or digital. Therefore, in the various embodiments of the present invention, one or more input processing elements 126 in the control circuit 118 can be selected via the programming port 108 to process the input signals from the field devices 105 and provide the control system 101 with an analog or digital input signal, as described below.

As shown in FIG. 1, the interface circuit 116 can be configured to only deliver and acquire signals from the field device 105. As previously described, one aspect of the present invention is to have a simplified interface circuit 116. Therefore, some, if not all of the signal processing functions for input and output signals can be realized in the control circuit 118. Consequently, the control circuit 118 can be configured to use a single I/O terminal for each channel and can be configured to operate with any number and type of input processing elements 126 and output processing elements 127. Thus, the control circuit 118 is configurable to allow an end user via the programming port 108 to select one of the input or output terminals 120, 122, 124, to couple the I/O port 102 to the selected terminal, or to specify the type of signal conditioning or conversion needed in between.

The signal routing and signal processing functionality of the control circuit 118 can be provided using any combination of programmable logic circuitry and signal processing circuitry. For example, the control circuit 118 can comprise any combination of PLA (programmable logic or gate array) devices, ASICs (application-specific integrated circuits), and/or discrete elements. However, it is also within the scope of the present invention to combine the control circuit 118 and the interface circuit 116 into a single integrated circuit. The control circuit 118 can include any number or type of signal processing circuits, including but not limited to circuits for storage and reconstruction of signals, separation of information from noise in signals, signal or data compression, and feature extraction. Therefore, the control circuit 118 can be used to allow the channel circuit 100 to be programmed to manage any type of I/O connections (digital or analog, input or output) using a signal wiring scheme. This considerably simplifies the structure of control systems and switching cabinets, and likewise the storage of replacement parts and maintenance expenses.

As previously described, while the control circuit 118 handles signal routing and processing between the I/O port 102 and the input and output connections 120, 122, and 124, the interface circuit 116 can be used to deliver and acquire signals from the field device 105. As previously described, one aspect of the present invention provides that rather than using separate signal paths to manage input and output of analog and digital signals, a single circuit can be used to provide this functionality. An exemplary block diagram 200 of interface circuit 116 is shown in FIG. 2.

Figure 2:
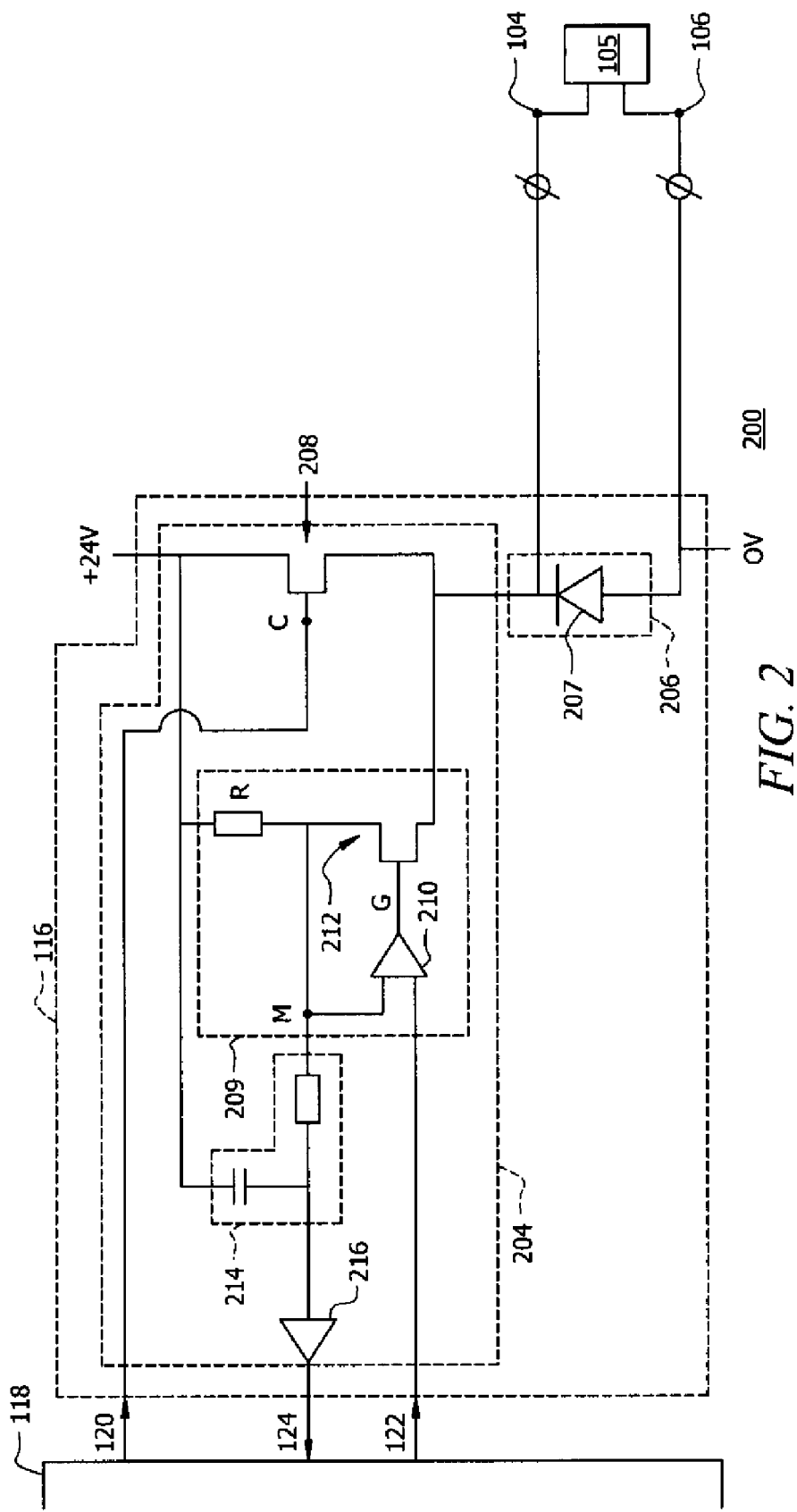
FIG. 2 is a more detailed block circuit diagram of an interface circuit for a channel circuit according to a first embodiment of the present invention.

As shown in FIG. 2, the interface circuit 116 can comprise a signal portion 204 and an output circuit portion 206 connected in series between a first and second reference voltage. In the various embodiments, the first reference voltage can be a signal voltage and the second reference voltage can be a ground voltage. For example, as shown in FIG. 2, the first and second voltages can be 24V and 0V, respectively, a typical voltage range for certain control systems. However, the invention is not limited in this regard and any voltage range can be specified by using the first and second reference voltages. In the various embodiments, the second terminal 106 is typically kept at the second voltage level to maintain a single orientation for voltages and currents. However, as shown in FIG. 2, one or more clamp diodes 207 can be provided in output portion 206 to protect digital switch devices in the interface circuit 116.

Although, the interface circuit 116 can be configured to provide any number of analog and digital inputs and output modes, in the various embodiments the interface circuit 116 provide at least three basic communication modes: digital output, analog output, and analog/digital input.

The first mode, digital output, occurs when the control circuit 118 provides a signal on digital output connection 120. In this first mode of operation, the digital output signal, a voltage, is provided across terminals 104 and 106 by generating a series of voltage pulses in response to digital signals provided to the control circuit 118. Although the voltage pulses from the control circuit 118 could be directly provided to the terminals 104, 106, typically the digital output from the control circuit 118 needs to be scaled to the range specified by the reference voltage. For example, in FIG. 2, the "HI" and "LO" digital signals for the field device 105 can comprise voltage levels of 24V and 0V, respectively. Therefore, to provide the necessary scaling, the voltage pulses from the control circuit 118 are instead provided at a control node (C) of a digital switch device 208 in the signal portion 204 of the interface circuit 116. For example, as shown in FIG. 2, a digital signal from the control circuit 118 can be provided via the digital output line 120 to the gate of a metal-oxide-semiconductor (MOS) transistor being used as the digital switch device 208. However, the invention is not limited in this regard and other types of switch devices, including bipolar transistors, responsive to a voltage provided by the control circuit 118 can also be used for digital switch device 208. Accordingly, as the digital switch device 208 is activated and deactivated, the signal on terminal 104 can be varied between the first reference voltage and a second voltage. The voltage across a load associated with the field device 105 connected to the terminal 104 and 106 can then also be varied between the first and second reference voltages.

The second mode of operation, analog output, occurs when the control circuit 118 provides a signal on an analog output connection 122. In this second mode of operation, the analog output signal at terminals 104, 106 of the interface circuit 116 is modulated based on the varying output voltage provided by the control circuit 118. Again, as in the digital output mode, the control circuit 118 can be configured to provide an analog output current. However this analog output current also would typically need to be scaled for a specific current range for use with field device 105. For example, 24V analog field devices typically operate using analog current signals in the range of 0-20 mA. Therefore, to provide the necessary scaling, the interface circuit 116 can be configured to convert voltage levels from the control circuit 118 to a current level. This can simplify design of the control circuit 118 by requiring that it only generate a varying voltage signal rather than an active amount of current. In particular, the voltage levels from the control circuit are used to drive a current source 209 coupled in parallel with the switch device 208. As shown in FIG. 2, the current source 209 can comprises a current source for grounded loads. That is, the current is provided by providing a series combination of a resistor R and an active device 212 between the first reference voltage and the grounded load in the field device (i.e., the second reference voltage is set to 0V). The active device 212 can be a voltage controlled active resistance device, such as a MOS transistor or bipolar transistor, having a control node (G) for varying the resistance between the conducting nodes of the device.

As shown in FIG. 2, the amount of current provided is controlled by adjusting the resistance of the active device 212. For example, in the case of a MOS transistor, a drain to source resistance would be adjusted. Additionally, as one of ordinary skill in the art will recognize, a stable current can be provided by incorporating a feedback element in the current source 209, namely by using an operational amplifier (OpAmp) 210 controlled by the combination of a feedback signal and the input voltage on the analog input signal line 122. As shown in FIG. 2, by selecting the feedback from a point between R and the active device, the result of the OpAmp is an output voltage that controls active device 212 to create a voltage drop over R that equals signal 122. In the case of the active device 212 comprising a MOS transistor, the output of the OpAmp 210 can be used to adjust a voltage at the gate of the MOS transistor and to adjust the drain to source resistance, adjusting the current. Accordingly, the current output to the load of the field device 105 is then proportional to signal 122. As the resistance of the active device 212 is reduced, current begins to flow through resistor R to terminal 104 and out to the load of the field device 105. One of ordinary skill in the art will recognize that the active device 212 and the resistor R can be selected to provide a specific range of output currents. For example, in some embodiments, a current range of 0 to 20 mA can be provided using resistor with a value of 200Ω. These values are presented only by way of example and not limitation, and one of ordinary skill in the art will recognize that a resistor R can be provided using any combination of resistive elements between the reference voltage and the active device 212. Additionally, when multiple resistive elements are used, the feedback signal can be selected from any point between the various resistive elements being used.

The third mode of operation, analog/digital input, can occur by monitoring a node voltage of the current source 209 during its operation. That is, the current source output can be fixed and the resulting variations in voltage at a node M of the current source 209, due to the connected field device 105, can be monitored. As previously described, the ability of the control circuit 118 to process and condition different types of signals also allows the control circuit 118 to be programmed to interpret and process any input signal as a digital or an analog signal. Therefore, in the various embodiments of the present invention, the same node M can be monitored to determine the input digital signal or the input analog signal. Such a configuration is advantageous as it minimizes the amount of circuitry needed in the interface circuit 116 and only requires the end user to specify to the control circuit 118 the type of signal expected from input line 124.

As shown in FIG. 2, the feedback voltage for comparator 210 can be monitored, as it will vary as the amount of current through the active device 212 and resistor R varies. These variations in this voltage can then be converted by the control circuit 118 to create digital signals for the control system 101. In operation, these voltages are monitored while saturating active device 212. That is, by providing a fixed voltage on the analog output line 122 between the control circuit 116 and the interface circuit 118, equivalent to voltage needed for providing the maximum allowed field current for the selected input type. Normally, this output voltage on the analog output signal line 122 would be used to specify an output current during an analog output mode. For example, for a typical 24V digital input signal, the analog input signal 122 can be set for the current source 209 to provide a 7 mA signal to the field device. The actual field current then would result in a corresponding voltage at node M, as previously discussed.

Typically, field devices then generate a digital signal by the opening or closing of a contact. Accordingly, as the field device 105 switches, the current will switch between 4 mA (field device switch closed) and 0 mA (field device switch open). Thus, as current flow is interrupted, the voltage levels will also vary at node M. In the exemplary embodiment in FIG. 2, the voltage at node M would vary between 24V (field device switch open) and 24V-(4 ma) R (reference voltage minus voltage drop across resistor R when field device switch is closed). The voltage at node M can then be converted to the necessary digital signal for the control system 101.

An analog input signal can be similarly monitored using the interface circuit 116. That is, a fixed value can be applied on the analog signal output line 122 (e.g., a voltage for generating the equivalent of 21 mA) and the resulting variations in voltage due to the field device 105 can be interpreted as an analog input signal by the control circuit 118. In the case of an analog signal, the field device 105 essentially varies current drawn from the terminal 104 to 106, resulting in varying voltage at node M. For example, for a typical 0-20 mA analog input signal, the analog output signal 122 can be set for the current source 209 to provide a 20 mA signal to the field device 105. Typically, field devices then generate an analog signal by varying their load resistance. Therefore, in FIG. 2, if the current source 209 is configured to provide 20 mA, the current will vary between 0 mA (field device providing a highly resistive load) and 20 mA (field device providing a low resistive load) as the load in the field device 105 varies. The monitored voltage at node M can then be converted to the necessary digital signal for the control system 101 by the control circuit 118.

In some embodiments, the monitored voltage can be filtered or amplified to provide a input signal to the control circuit 118 with sufficient magnitude to be detected or to eliminate transients in the voltage at node M. For example, the control circuit 118 may be configured to detect a specific range and/or to process specific shapes of voltage signals accurately. However, such signal conditioning can also be necessary when the control circuit 118 and the interface circuit 116 are implemented as separate elements and signal degradation is occurring. Accordingly, as shown in FIG. 2, the signal at the monitored node M can be directed through one or mode filter elements 214 or one or more buffer or amplifier elements 216 to condition the monitored voltages prior to transmittal of the monitored signals to the control circuit 118 over input signal line 124. However, the invention is not limited in this regard and the filter elements 214 and/or the buffer elements 216 can instead be implemented in the control circuit 118.

Figure 3:
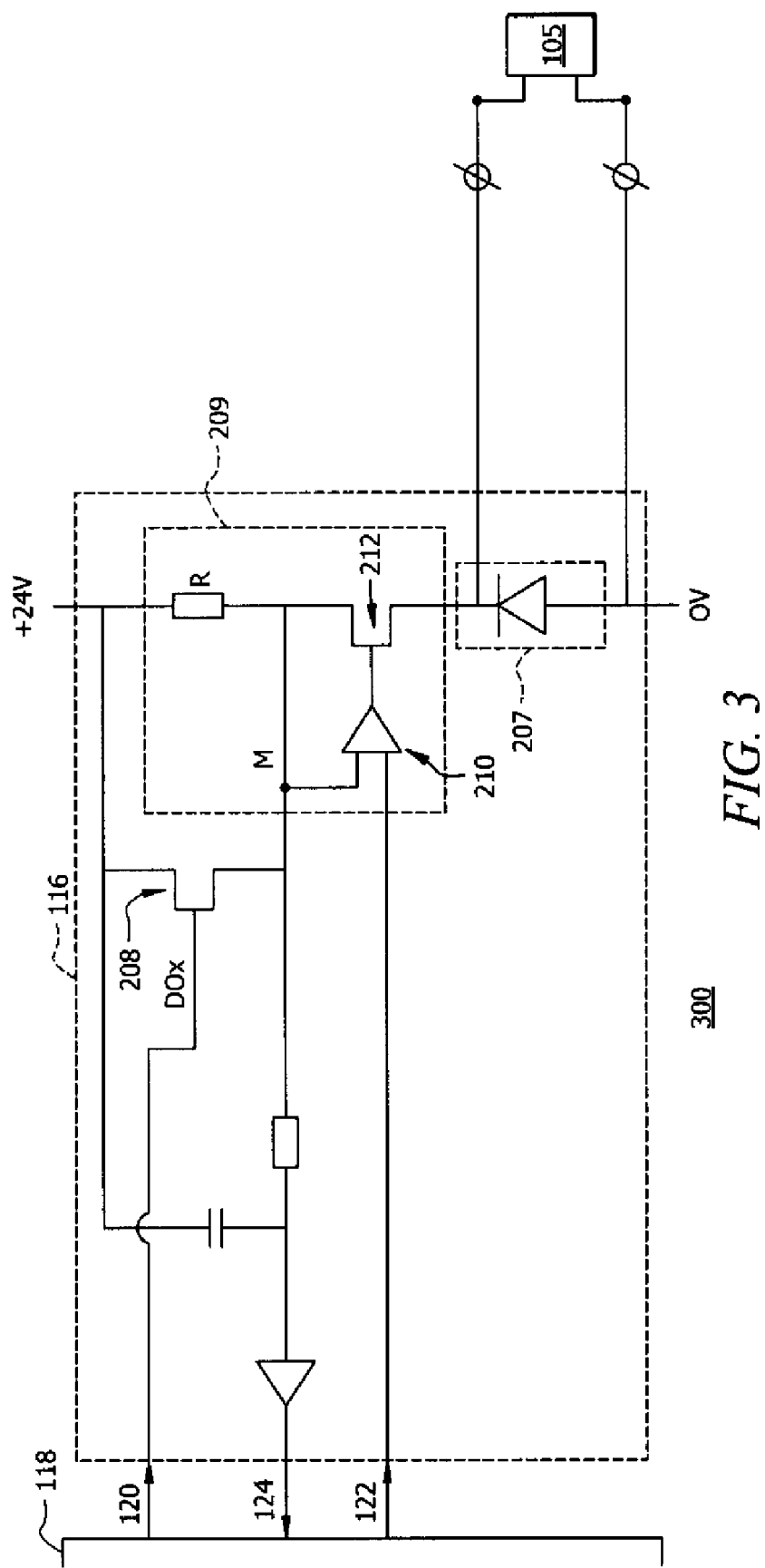
FIG. 3 is a more detailed block circuit diagram of an interface circuit for a channel circuit according to a second embodiment of the present invention.

The present invention is not limited to the specific implementation of the interface circuit 116 shown in block diagram 200. FIG. 3 shows a block diagram 300 for an alternate embodiment of the interface circuit 116. In block diagram 300, rather than coupling the current source 209 and the digital switch device 208 in parallel to provide separately controlled digital and analog output signals for the interface circuit 116, the digital switch device 208 is instead connected in parallel with the resistor R associated with the current source 209. In operation, the analog output and analog/digital input modes would operate the same as previously described for FIG. 2. However, the interface circuit 116 operates in a digital output mode using two signals to generate the digital output at terminal 104. In such embodiments, the digital output mode is first enabled by using a signal on the digital output line 120 to activate the digital switch device 208 to bypass resistor R and access the first reference voltage directly. Afterwards, to generate a varying output digital signal, the digital signal pattern can instead be provided on analog input line 122. In particular, the signal on input line 122 can be varied between first and second voltage levels to produce first and second current levels at terminal 104. For example, the currents produced can be 0 and 4 mA, specifying "ON" and "OFF" states for the current source. Thus in the ON state, when the active device 212 is turned on and the resistor R is bypassed by the digital switch device 208, the voltage at the first terminal 104 is raised to the reference voltage. Conversely, in the OFF state, when the active device 212 is turned off, no voltage is applied across terminals 104 and 106. Accordingly, the digital voltage signal is provided by varying signal 122 between two levels in the interface circuit 116 and across the load associated with the field device 105, resulting in varying digital voltage signal. Such a configuration allows digital switch 208 to be implemented using much smaller and lower power MOS transistor devices, which further reduces size and cost of the interface circuit 116.

While various embodiments of the present invention have been described above, it should be understood that they have been presented by way of example only, and not limitation. Numerous changes to the disclosed embodiments can be made in accordance with the disclosure herein without departing from the spirit or scope of the invention.

Figure 4:
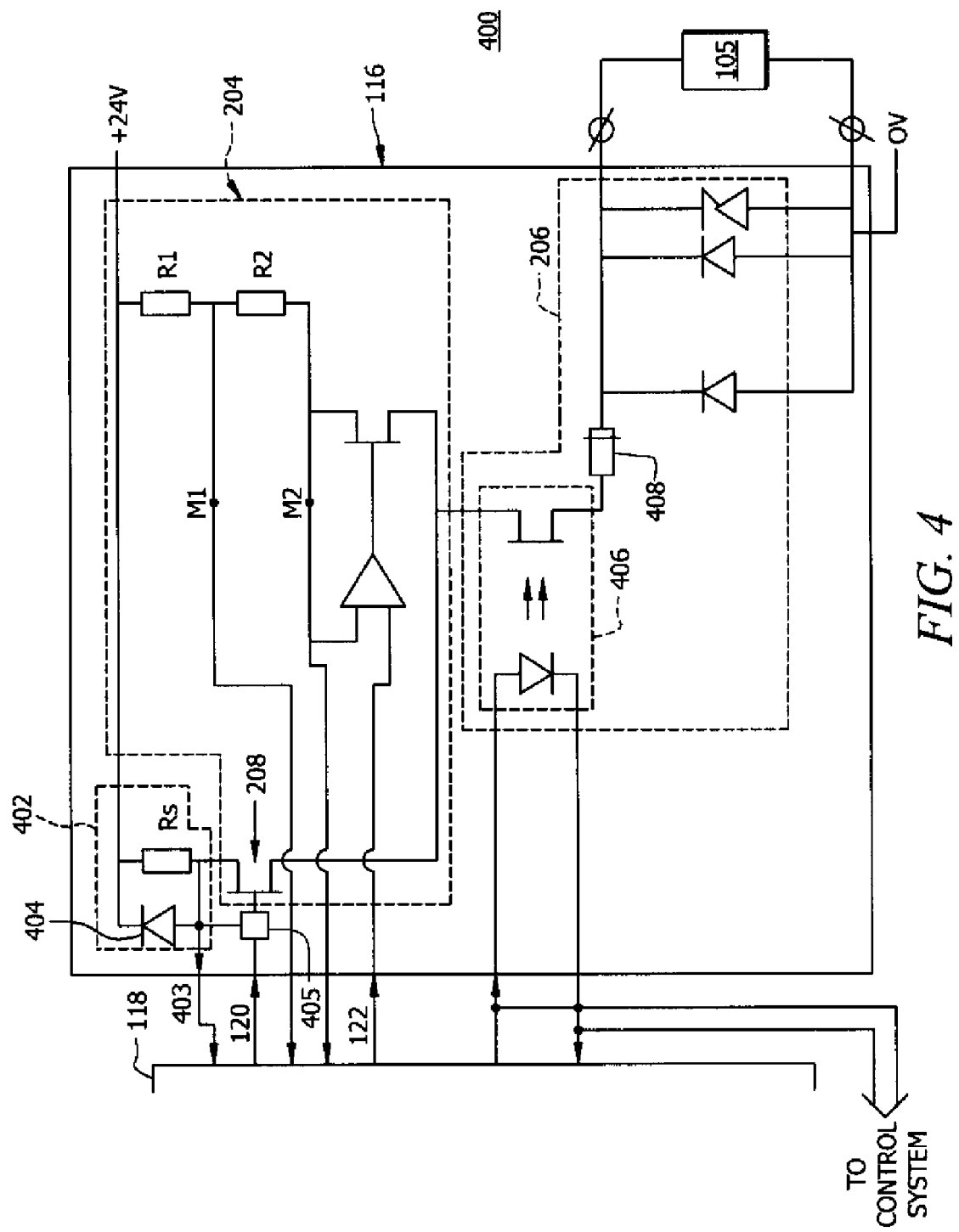
FIG. 4 is a more detailed block diagram of an interface circuit for a channel circuit including safety and monitoring features according to the various embodiments of the present invention.

In some embodiments, additional features can be added to the interface circuit to provide additional monitoring and/or safety features. For example, in some embodiments of the present invention, multiple voltages in the current source of the interface circuit can be monitored, as shown in FIG. 4. In such embodiments, by providing known values for resistors R1 and R2, the output voltages nodes M1 and M2 can be compared by the control circuit 118 to determine whether the channel circuit is properly operating. This can be accomplished by calculating the ratio of voltages at M1 and M2 and determining that the ratio is, e.g., within 1% of the ratio of R1 and R2. In these embodiments, an identical set of filtering and/or amplifying elements, as previously described, can be used for the voltages at M1 and M2. Such comparisons can be done at intervals or on a continuous basis. In some embodiments, if the ratio is incorrect, the control circuit 118 can be configured to deactivate the channel circuit or to generate an error signal for the control system.

In other embodiments, it can be desirable to monitor the current during a digital output of the interface circuit to prevent damage to the digital switch device 208. For example, FIG. 4 is a block diagram 400 of an exemplary interface circuit including safety and monitoring features according an embodiment of the invention. A current sense circuit 402 can be placed in series with the digital output switch 208. In these embodiments, the current sense circuit 402 can be used to generate a sense voltage for a sense voltage line 403 coupled to the control circuit 118. The sense voltage can be used by the control circuit 118 to determine the current flowing through the digital output switch 208. For example, as shown in FIG. 4, the current sense circuit can be implemented using a resistor Rs. In some embodiments, shown in FIG. 4, an optional clamp diode 404 can be coupled in parallel with the resistor Rs. Based on sense voltage and the value of sense resistor Rs, the control circuit 118 can determine if an over current condition exists. Accordingly, the control circuit 118 can be configured to deactivate the channel circuit or to generate an error signal for the control system. Also in the embodiment shown in FIG. 4, the sense voltage from the sense circuit 402 can be used to operate a pass element 405 for the input of the digital switch device 208. That is, as long as the voltage generated by the current sense circuit 402 is below 0.5V, the digital output signal is not blocked by the pass device 405, as the sense voltage introduces only small voltage drop across sense resistor Rs and thus, reference voltage 114 is being provided to field device 105. Conversely, if the voltage across Rs exceeds the limit, this indicates a large field current. The actual field current is limited immediately and switched off if the current limit situation persists.

In yet other embodiments, the interface circuit can be implemented with fuse element or other pass elements prior to terminals 104, 106 to protect field wiring in case of a defect interface circuit 116. For example, as shown in FIG. 4, one or more pass elements 406 and/or fuse elements 408 can be placed between the signal portion 204 and output portion 206 of the interface circuit 116. The fuse elements 408 can be configured to present open circuits upon detection of an over current condition. In the various embodiments, resetting of the fuse elements 408 can be accomplished electrically (cooling due to removal of overload condition) or mechanically (by replacing a blown fuse). However, some fuse elements 408 can require the end user to return the module to have the fuse elements 408 in the interface circuit 116 be physically replaced. The pass elements 406 can comprise switching elements that can be controlled by the control circuit 118, the control system, or any combination thereof. That is, the pass elements 406 provide independent means of disconnecting the field device 105 from the interface circuit 116. For example, as shown in FIG. 4, pass elements 406 can be implemented as an optically coupled transistor, such as in photo-couplers or optically coupled MOS transistors. However, the invention is not limited in this regard and conventional relays, MOS transistors, and bipolar transistors can also be used as pass elements 406.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A programmable channel circuit for coupling signals between field devices and control systems, comprising:
    a control circuit having at least one bidirectional I/O terminal for coupling to a control system, at least one programming terminal, and one or more processing elements;
    and an interface circuit having a signal portion and an output circuit portion that includes first and second field terminals for coupling a field device across said first and second field terminals, said signal portion of said interface circuit coupled to said control circuit via said processing elements,
    wherein said control circuit is operable to respond to a programming signal applied to said programming terminal for automatically selecting one of a plurality of signal modes for said channel circuit,
    wherein said plurality of signal modes include an analog output mode that delivers analog signals from said control system to said signal portion that are output across said first and second field terminals to said field device, a digital output mode that delivers digital signals from said control system to said signal portion that are output across said first and second field terminals to said field device, an analog input mode that receives analog signals from said field device across said first and second field terminals to said signal portion for delivery to said control system, and a digital input mode that receives digital signals from said field device across said first and second field terminals to said signal portion for delivery to said control system,
    wherein said control circuit provides separate connections to said interface circuit including to independent signal paths for said signals associated with at least said analog output mode, at least one of said analog input mode and said digital input mode, and said digital output mode, and
    wherein said interface circuit includes a current source in a signal path for at least two of said analog input mode, said digital input mode and said analog output mode.

2. The channel circuit of claim 1, wherein said first field terminal is a signal terminal and said second field terminal is a fixed voltage reference terminal, wherein said independent signal paths include:
    a first signal path for said analog input mode including through an active output device that is directly coupled to said signal terminal,
    a second signal path for said analog output mode including coupling to a control node of said active output device,
    a third signal path for said digital output mode, said third signal path electrically in parallel to both said first signal path and said second signal path.

3. The channel circuit of claim 2, wherein said channel circuit has only two field terminals consisting of said signal terminal and said fixed voltage reference terminal.

4. The channel circuit of claim 1, wherein said processing elements comprise at least one digital input processing element, one analog input processing element, one digital output processing element, and at least one analog output processing element, and
    wherein responsive to programming signal specifying said digital or said analog output communications mode for said channel circuit, said bidirectional I/O terminal is coupled to said output processing element associated with said specified communications mode, and wherein said output processing element is configured to generate a control signal for said interface circuit associated with said specified communications mode.

5. The channel circuit of claim 1, wherein said processing elements comprise at least one digital input processing element, one analog input processing element, one digital output processing element, and at least one analog output processing element, and
   wherein responsive to programming signal specifying said digital or said analog input mode for said channel circuit, said I/O terminal is coupled to said first field terminal via said input processing element associated with said specified communications mode, and said output processing element is configured to generate a control signal for said interface circuit associated with said specified communications mode.

6. The channel circuit of claim 1, wherein said processing elements comprise at least one digital input processing element, one analog input processing element, one digital output processing element, and at least one analog output processing element, and
   wherein said interface circuit further comprises:
   a switch having a switch control node and first and second switch nodes, said switch control node coupled to said digital output processing element, said first switch node coupled to a first reference voltage, and said second switch node coupled to said first field terminal, said switch device control node responsive to a switch control voltage for switching between a current blocking state and a current conducting state between said first and said second switch nodes;
   an active device having an active device control node and first and second active device nodes, said first active device node coupled to said first reference voltage, and said second active device node coupled to said first field terminal, said active device control node responsive to an active device control voltage for selectively varying a resistance between said first and said second active device nodes,
   wherein an output voltage at said first terminal alternates between said first reference voltage and a second reference voltage responsive to a digital signal from said digital output processing element, and wherein an output current at said first terminal varies according to said resistance varying responsive to an analog signal from said analog output processing element.

7. The channel circuit of claim 6, said interface circuit further comprising:
   a comparator having first and second comparator input nodes and a comparator output node, said first comparator input node coupled to said first active device node, said second comparator input node coupled to said analog output processing element, and said comparator output node coupled to said active device control node;
   and at least one resistive element coupled between said first device active node and said reference voltage.

8. The channel circuit of claim 6, wherein said control circuit couples a monitoring node of said interface circuit to said bidirectional I/O terminal responsive to said control signal specifying said analog input mode or said digital output mode.

9. The channel circuit of claim 1, wherein said control circuit provides one of said independent signal paths for both said analog input mode and said digital input mode.

10. A method for communicating between control systems and field devices, comprising: coupling a field device to a control system via a channel circuit, said channel circuit comprising a control circuit having at least one bidirectional I/O terminal coupled to said control system, at least one programming terminal, and one or more processing elements, and an interface circuit having a signal portion and an output circuit portion that includes first and second field terminals having said field device coupled across, said signal portion of said interface circuit coupled to said control circuit via said processing elements; and
   applying a programming signal to said channel circuit via said programming terminal,
   wherein responsive to said programming signal, said control circuit is operable to automatically select one of a plurality of signal modes for said channel circuit, wherein said selection couples said bidirectional I/O terminal to said first and said second field terminals via one of said processing elements associated with said selected one communications mode,
   when said plurality of signal modes include an analog output mode that delivers analog signals from said control system to said signal portion that are output across said first and second field terminals to said field device, a digital output mode that delivers digital signals from said control system to said signal portion that are output across said first and second field terminals to said field device, an analog input mode that receives analog signals from said field device across said first and second field terminals to said signal portion for delivery to said control system, and a digital input mode that receives digital signals from said field device across said first and second field terminals to said signal portion for delivery to said control system,
   wherein said control circuit provides separate connections to said interface circuit including to independent signal paths for said signals associated with at least said analog output mode, at least one of said analog input mode and said digital input mode, and said digital output mode, and
   wherein said interface circuit includes a current source in a signal path for at least two of said analog input mode, said digital input mode and said analog output mode.

11. The method of claim 10, said step of coupling further comprising selecting said field device to have at least one digital input processing element, one analog input processing element, one digital output processing element, and at least one analog output processing element.

12. The method of claim 11, the step of configuring further comprising specifying said digital or said analog output communications mode for said channel circuit, wherein responsive to said specified output communications mode, said bidirectional I/O terminal is coupled to said output processing element associated with said specified communications mode and said output processing element is configured to generate a control signal for said interface circuit associated with said specified communications mode.

13. The method of claim 11, the step of configuring further comprising specifying said digital or said analog input mode for said channel circuit, wherein responsive to said specified input mode, wherein said bidirectional I/O terminal is coupled to said first field terminal via said input processing element associated with said specified mode and said output processing element is configured to generate a control signal for said interface circuit associated with said specified communications mode.

14. The method of claim 11, the step of coupling further comprising selecting said interface circuit comprising:
- a switch having a switch control node and first and second switch nodes, said switch control node coupled to said digital output processing element, said first switch node coupled to a first reference voltage, and said second switch node coupled to said first field terminal, said switch device control node responsive to a switch control voltage for switching between a current blocking state and a current conducting state between said first and said second switch nodes;
- an active device having an active device control node and first and second active device nodes, said first active device node coupled to said first reference voltage, and said second active device node coupled to said first field terminal, said active device control node responsive to an active device control voltage for selectively varying a resistance between said first and said second active device nodes,
- wherein an output voltage at said first terminal alternates between said first reference voltage and a second reference voltage responsive to a digital signal from said digital output processing element, and wherein an output current at said first terminal varies according to said resistance varying responsive to an analog signal from said analog output processing element.

15. The method of claim 14, said interface circuit further comprising:
- a comparator having first and second comparator input nodes and a comparator output node, said first comparator input node coupled to said first active device node, said second comparator input node coupled to said analog output processing element, and said comparator output node coupled to said active device control node; and
- at least one resistive element coupled between said first active device node and said reference voltage.

16. The method of claim 15, wherein said first field terminal is a signal terminal and said second field terminal is a fixed voltage reference terminal, and wherein said independent signal paths include:
- a first signal path for said analog input mode including through an active output device that is directly coupled to said signal terminal,
- a second signal path for said analog output mode including coupling to a control node of said active output device,
- a third signal path for said digital output mode, said third signal path electrically in parallel to both said first signal path and said second signal path.

17. The method of claim 16, wherein said channel circuit has only two field terminals consisting of said signal terminal and said fixed voltage reference terminal.

18. The method of claim 10, wherein said analog input mode and said digital input mode both utilize a common signal path that is coupled to said control circuit.

19. The method of claim 10, further comprising monitoring along a signal path associated with a non-selected one of said signal modes while a signal path associated with a selected one said signal modes is active.

20. The method of claim 19,
- wherein said non-selected one of said signal modes comprises said digital input mode and said selected one said signal modes comprises said digital output mode, or
- wherein said non-selected one of said signal modes comprises said analog input mode and said selected one said signal modes comprises said analog output mode.

* * * * *